(12) United States Patent
Rogers

(10) Patent No.: US 6,833,012 B2
(45) Date of Patent: Dec. 21, 2004

(54) PETROLEUM PITCH-BASED CARBON FOAM

(75) Inventor: Darren Kenneth Rogers, Wheeling, WV (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 52 days.

(21) Appl. No.: 09/976,175

(22) Filed: Oct. 12, 2001

(65) Prior Publication Data

US 2003/0071384 A1 Apr. 17, 2003

(51) Int. Cl.⁷ .................................................. C10C 5/00
(52) U.S. Cl. ........................... 44/607; 56/78; 264/29.6; 264/29.7; 00/445 R; 00/448; 00/460
(58) Field of Search ...................... 44/607, 620; 156/78; 264/29.6, 29.7; 423/445 R, 448, 460; 428/489

(56) References Cited

U.S. PATENT DOCUMENTS 3,928,170 A * 12/1975 Takahashi et al. ............ 208/40
6,033,506 A * 3/2000 Klett ............................ 156/78

* cited by examiner

Primary Examiner—Margaret B. Meldey
(74) Attorney, Agent, or Firm—McGuireWoods LLP

(57) ABSTRACT

Petroleum or coal tar pitch-based cellular or porous products having a density of preferably between about 0.1 g/cm³ and about 0.8 g/cm³ are produced by the controlled heating of mesophase carbon materials derived from coal tar or petroleum pitch having a softening point in excess of about 300° C. and preferably between about 300 and about 400° C. in a "mold" and under a non-oxidizing atmosphere. The porous product thereby produced, preferably as a net shape or near net shape, can be machined, adhered and otherwise fabricated to produce a wide variety of low cost, low density products.

17 Claims, No Drawings

PETROLEUM PITCH-BASED CARBON FOAM

FIELD OF THE INVENTION

The present invention relates to carbon foam materials, and more particularly to such materials derived from petroleum pith starting materials.

BACKGROUND OF THE INVENTION

U.S. patent application Ser. No. 09/453,729 filed Dec. 2, 1999 and entitled, "Coal-Based Carbon Foams", describes a family of high strength and abrasion resistant carbon foams having densities of preferably between about 0.1 g/cm$^3$ and about 0.8 g/cm$^3$ that are produced by the controlled heating of low cost, coal particulate, preferably up to ¼ inch in diameter, in a "mold" and under a non-oxidizing atmosphere. Because of the relatively low cost of the starting material, and the significantly high strength and other properties of these materials, such foams are highly economically desirable So called, "carbonaceous mesophase" materials are nematic forms of carbon commonly derived from isotropic petroleum or coal tar pitches using a variety of well known techniques. Such materials take the physical form of very fine particulate or powders and are commonly applied in the fabrication of high strength carbon fibers and the like.

Among the techniques used to prepare these materials are: 1) thermal polymerization patented by Singer, U.S. Pat. No. 4,005,183 and 2) a solvent extraction process using toluene, heptane, benzene or the like solvents to extract high molecular weight fractions from an isotropic pitch as described by Riggs and Diefendorf in U.S. Pat. No. 4,208,267.

According to the Singer technique, an isotropic petroleum pitch is heated to a temperature of between 400 and 450° C. under an inert atmosphere for about 40 hours. Under this treatment, about 50% of the isotropic phase is converted to an anisotropic phase. Because of the greater density of the latter material, it is collected at the bottom of the heating vessel. The product of this process exhibits a broad molecular weight and a high (240+° C.) and ill defined softening point.

When treated in accordance with the Riggs and Diefendorf technique the solvent extract can be converted to a mesophase material by heating for only about 10 minutes at a temperature of between about 230 and 400° C.

Both of these processes begin with a feedstock comprising an isotropic pitch that is a by-product of the petroleum and coal tar industries. Such feedstocks conventionally exhibit softening points in the range of from about 240° C. to about 280° C. While such feedstocks are relatively inexpensive, they often and generally do contain insoluble carbon solids that decrease the mechanical properties of carbon fibers manufactured therefrom, and are therefore considered highly inferior for this purpose.

Subsequent developments included the design of mesophase production approaches involving the treatment of high purity starting materials such as pure aromatic hydrocarbons, for example, naphthalene that have been developed by Mitsubishi Gas and Chemical of Japan. While more suited to the preparation of carbon fibers, these materials are considerably more expensive than those derived from petroleum or coal tar pitch and therefore not economically suitable for many applications, such as the production of carbon foam, due to cost.

While the coal-based starting materials of U.S. patent application Ser. No. 09/453,729 provide a ready source of low cost starting material for the production of highly desirable carbon foams, it has been considered that other similar low cost materials such as petroleum pitch or coal tar pitch might also be used as starting materials for the production of competitive carbon foams. The application of processes similar to those used to obtain coal-based carbon foams from coal particulate to the production of low softening point pitch-based mesophase carbon materials has proven problematic.

Apparently because of the relatively low and broad softening points of isotropic coal tar and petroleum pitch materials (generally in the range of from about 240° C. to about 280° C.), the application of foaming processes such as those described in aforementioned U.S. patent application Ser. No. 09/453,729 is very difficult and attempts to foam them in this fashion have generally failed. Such failure is primarily due to the fact that, although the mesophase materials derived from such "low softening point" petroleum and coal tar pitches, as just described, can be "foamed" using processes similar to those described in connection with the production of coal-based carbon foams, they tend to "slump" or collapse upon themselves during the foaming process resulting in a relatively dense, if somewhat porous, mass, unless extremely tight process controls are applied. Even when such care is taken, the variability of such petroleum and coal tar pitches often results in failure of the foaming operation. Thus such foams have not until now been found highly useful as low density and high strength structural, insulating, ablation resistant or abrasive foam materials.

OBJECTS OF THE INVENTION

It is therefore an object of the present invention to provide a useful and reliable method for the production of carbon foams from isotropic petroleum and coal tar pitch starting materials.

It is another object of the present invention to provide a method for the production of carbon foam from isotropic petroleum and coal tar pitch that is relatively easy to implement and control and therefore economically and commercially feasible.

It is yet another object of the present invention to produce a low density, high strength carbon foam from isotropic petroleum and coal tar pitch-based starting materials.

SUMMARY OF THE INVENTION

According to the present invention there is provided a method for the production of carbon foam using as a starting material an isotropic coal tar or petroleum pitch having a softening point above about 300° C. Additionally, according to the present invention there are provided petroleum or coal tar pitch-based cellular or porous products, i.e. foams, having a density of preferably between about 0.1 g/cm$^3$ and about 0.8 g/cm$^3$ that are produced by the controlled heating of mesophase carbon materials derived from coal tar or petroleum pitches that exhibit softening points in excess of about 300° C., and preferably between about 300 and about 400° C., in a "mold" and under a non-oxidizing atmosphere. The porous product thereby produced, preferably as a net shape or near net shape, can be machined, adhered and otherwise fabricated to produce a wide variety of low cost, low density products, or used in its preformed shape as a filter, heat or electrical insulator etc. Such cellular products, without further treatment and/or the addition of strengthening additives exhibit compressive strengths of up to and above about 4000 psi, and even up to 6000 psi. Impregnation with appropriate materials or the incorporation of various strength improving additives can further increase the compressive, tensile and other properties of these cellular materials. Further treatment by carbonization or graphitization yields cellular products that can be used as electrical or heat conductors.

DETAILED DESCRIPTION

According to the present invention, a preformed, low density, i.e., from about 0.1 to about 0.8 g/cm$^3$, and preferably from about 0.1 to about 0.6 g/cm$^3$, cellular product is produced from mesophase carbon derived from isotropic petroleum or coal tar pitch having a softening point above about 300° C. by the controlled heating of the mesophase carbon in a "mold" under a non-oxidizing atmosphere. The mesophase carbon may derived from a wide range of isotropic petroleum and coal tar based pitches having softening points in excess of 300° C. and preferably between about 300 and about 400° C. The cellular pitch-based products described herein are semi-crystalline or more accurately turbostratically-ordered and largely isotropic i.e., demonstrating physical properties that are approximately equal in all directions. The cellular pitch-based foams of the present invention typically exhibit pore sizes on the order of less than 300$\mu$, although pore sizes of up to 500$\mu$ are possible within the operating parameters of the process described. The thermal conductivities of the cellular pitch-based products are generally less than about 1.0 W/m/° K. Typically, the pitch-based foams of the present invention demonstrate compressive strengths on the order of from about 2000 to about 6000 psi at densities of from about 0.4 to about 0.5 g/cm$^3$ It is critical to the successful practice of the present invention that the mesophase carbon starting material be derived from an isotropic petroleum or coal tar pitch that exhibits the previously specified elevated softening point. Isotropic pitch-derived mesophase carbon materials exhibiting softening points below these preferred ranges may heave upon foaming and "slump" or collapse upon themselves leaving a dense compact that cannot be properly characterized as a "foam".

The production method of the present invention comprises: 1) heating an mesophase carbon material derived from an isotropic petroleum or coal tar pitch having a softening point in excess of 300° C. in a "mold" and under a non-oxidizing atmosphere at a heat up rate of from about 1 to about 20° C. to a temperature of between about 300 and about 700° C.; 2) soaking at a temperature of between about 300 and 700° C. for from about 10 minutes up to about 12 hours to form a green foam; and 3) controllably cooling the green foam to a temperature below about 100° C. The non-oxidizing atmosphere may be provided by the introduction of inert or non-oxidizing gas into the "mold" at a pressure of from about 0 psi, i.e., free flowing gas, up to about 500 psi. The inert gas used may be any of the commonly used inert or non-oxidizing gases such as nitrogen, helium, argon, $CO_2$, etc The starting material mesophase carbon material may be derived from the specified "high softening point" isotropic pitch by any of the previously described thermal or solvent extraction methods or any other suitable method that does not adversely affect the ability of the mesophase carbon to foam as described herein.

It is generally not desirable that the reaction chamber or "mold", as described hereinafter, be vented or leak during the heating and soaking operation. The pressure of the chamber and the increasing volatile content therein tends to retard further volatilization while the cellular product sinters at the indicated elevated temperatures. If the chamber or mold is vented or leaks during soaking, an insufficient amount of volatile matter may be present to permit interparticle sintering of the mesophase particles thus resulting in the formation of a sintered powder as opposed to the desired cellular foam product. Thus, according to a preferred embodiment of the present process, venting or leakage of non-oxidizing gas and generated volatiles is inhibited consistent with the production of an acceptable cellular product.

Additional more conventional blowing agents may be added to the mesophase particulate prior to expansion to enhance or otherwise modify the pore-forming operation.

The term "mold", as used herein is meant to define a mechanism for providing controlled dimensional forming of the expanding mesophase carbon. Thus, any chamber into which the mesophase carbon is deposited prior to or during heating and which, upon the mesophase carbon attaining the appropriate expansion temperature, contains and shapes the expanding mesophase carbon to some predetermined configuration such as: a flat sheet; a curved sheet; a shaped object; a building block; a rod; tube or any other desired solid shape can be considered a "mold" for purposes of the instant invention. The term "mold" as used herein, is meant to include any container, even an open topped container that "contains" the expanding mixture so long as such a device is contained in a pressurizable vessel that will permit controlled foaming. Clearly, a container that results in the production of some particular near net or net shape is particularly preferred.

As will be apparent to the skilled artisan familiar with pressurized gas release reactions, as the pressure in the reaction vessel, in this case the mold increases, from 0 psi to 500 psi, as imposed by the non-oxidizing gas, the reaction time will increase and the density of the foam will increase as the size of the "bubbles" or pores produced in the expanded mesophase carbon decreases. Similarly, a low soak temperature at, for example about 400° C. will result in a larger pore or bubble size and consequently a less dense foam than would be achieved with a soak temperature of about 600° C. Further, the heat-up rate will also affect pore size, a faster heat-up rate resulting in a smaller pore size and consequently denser expanded green foam than a slow heat-up rate. A preferred heat up rate is between 2 and 10° C./minute. These phenomenon are, of course, due to the kinetics of the volatile release reactions which are affected, as just described, by the ambient pressure and temperature and the rate at which that temperature is achieved. These process variables can be used to custom produce the foams of the present invention in a wide variety of controlled densities, strengths etc.

Cooling of the green foam after soaking is not particularly critical except as it may result in cracking of the green foam as the result of the development of undesirable thermal stresses. Cooling rates less than 10° C./min to a temperature of about 100° C. are typically used to prevent cracking due to thermal shock. Somewhat higher, but carefully controlled, cooling rates may however, be used to obtain a "sealed skin" on the open cell structure of the product as described below. The rate of cooling below 100° C. is in no way critical.

After expanding the mesophase carbon material as just described, the green foam is an open celled material. Several techniques have been developed for "sealing" the surface of the open celled structure to improve its adhesive capabilities for further fabrication and assembly of a number of parts. For example, a layer of a commercially available graphitic adhesive can be coated onto the surface and cured at elevated temperature or allowed to cure at room temperature to provide an adherent skin. Alternatively, the expansion operation can be modified by cooling the expanded green foam rapidly, e.g., at a rate of 10° C./min or faster after expansion. It has been discovered that this process modification results in the formation of a more dense skin on the green foam, which presents a closed pore surface to the outside thereof. At these cooling rates, care must be exercised to avoid cracking of the green foam. After expanding, the green foam is readily machineable, sawable and otherwise readily fabricated using conventional fabrication techniques such as sawing, machining, etc.

Subsequent to production of the green foam as just described, it may be subjected to carbonization and/or graphitization according to conventional processes to obtain particular properties desirable for specific applications of the type described hereinafter. Ozonation may also be performed, if activation of the coal-based expanded product would be useful in a final product application such as in filtering of air. Additionally, a variety of additives and structural reinforcers may be added to the green foam either before or after expansion to enhance specific mechanical properties such as fracture strain, fracture toughness and impact resistance. For example, particles, whiskers, fibers, plates, etc. of appropriate carbonaceous or ceramic composition can be incorporated into the green foam to enhance its mechanical properties.

The open celled products of the present invention can additionally be impregnated with; for example, additional petroleum pitch, epoxy resins or other polymers using a vacuum assisted resin transfer type of process. The incorporation of such additives provides load transfer advantages similar to those demonstrated in carbon composite materials. In effect a 3-D composite is produced that demonstrates enhanced impact resistance and load transfer properties.

The cooling step in the expansion process results in some relatively minimal shrinkage on the order of less than about 5% and generally in the range of from about 2% to about 3%. This shrinkage must be accounted for in the production of near net shape preforms or final products of specific dimensions and is readily determinable through trial and error with the particular coal starting material being used. The shrinkage may be further minimized by the addition of inert solid material such as coke particles, ceramic particles, ground waste from the coal expansion process etc. as is common practice in ceramic fabrication.

Carbonization, sometimes referred to as calcining, is conventionally performed by heating the green foam under an appropriate inert gas at a heat-up rate of less than about 5° C. per minute to a temperature of between about 800° C. and about 1200° C. and soaking for from about 1 hour to about three or more hours. Appropriate inert gases are those described above that are tolerant of these high temperatures. The inert atmosphere is supplied at a pressure of from about 0 psi up to a few atmospheres. The carbonization/calcination process serves to remove additional of the non-carbon elements present in the green foam such as sulfur, oxygen, hydrogen, etc.

Graphitization, commonly involves heating the green foam either before or after carbonization at heat-up rate of less than about 10° C. per minute, preferably from about 1° C. to about 5° C. per minute, to a temperature of between about 1700° C. and about 3000° C. in an atmosphere of helium or argon and soaking for a period of less than about one hour. Again, the inert gas may be supplied at a pressure ranging from about 0 psi up to a few atmospheres.

The porous pitch-based foams resulting from processing in accordance with the foregoing procedures can be used in a broad variety of product applications, some, but not all, of which will now be broadly described.

Perhaps the simplest products that could be fabricated using the foams of the present invention are various lightweight sheet products useful in the construction industry. Such products may involve the lamination of various facing materials to the surface of a planar sheet of the foam using an appropriate adhesive. For example, a very light and relatively inexpensive wall board would simply have paper laminated to its opposing planar surfaces, while a more sophisticated curtain wall product might have aluminum sheet, polymer or fiber-reinforced polymer sheets or even stainless steel sheet laminated thereto. A wide variety of such products that having lightweight, low cost and adequate strength can easily be envisioned for wallboard, structural wallboard, bulkheads, etc. Various of the foam products of the present invention exhibit sound insulation and vibration resistance due to excellent sound and vibration damping properties, good thermal insulating properties (less than about 1 watt per meter K thermal conductivity).

Laminates of these foams may even be used to produce heating element incorporating members, since a graphitized foam core could serve as an electrical heating element when connected to an appropriate source of electrical energy.

Similar surface laminated foam products could also find use in the transportation industry where lighter and, especially fire retardant walls, bulkheads, containers, etc. are in constant demand. Such products would of course require that the foam core be carbonized as described hereinabove prior to application of the exterior skins, if fire resistance or retardancy is desired.

Yet another product application for the foam products of the present invention is as a replacement for the ceramic foam filters currently applied in the filtering of molten metal such as aluminum for the removal of contaminating particulates also called inclusions. The current ceramic foam materials are relatively expensive and extremely friable. It is easily possible to produce a foam of the type described herein having an appropriate pore size and of the same size and shape as the ceramic foam filter using the above described fabrication process, to serve as a molten metal filter of this type. The cost of such a more robust, i.e., less friable, filter would be considerably less than that of a comparable ceramic foams filter.

Yet other product applications for the materials of the present invention reside in the field of heat exchangers. In this application, the heat transfer properties of a graphitized foam can be exploited to produce a heat exchanger capable of extracting heat from or adding heat to a fluid (gas or liquid) flowing through the foam pores. In this case, the foam product is joined to an appropriate heat transfer mechanism such as an aluminum skin.

As already alluded to, the foam products of the present invention can be produced in any solid geometric shape. Such production is possible using any number of modified conventional processing techniques such as extrusion, injection molding, etc. In each of such instances, the process must, of course, be modified to accommodate the processing characteristics of the starting material mesophase carbon. For example, in extruding such products, as described below, starting material is fed by an auger into an expansion chamber where it is expanded and from which it is extruded while still viscous. Upon exiting the extrusion die, the material is cooled to provide a solid shape of the desired and precalculated dimensions. To improve the efficiency, i.e., cycle time of the process, the input material can be preheated to a temperature below the expansion point, e.g., below about 300° C., fed into the auger chamber where additional heat is imparted to the mass to provide adequate softening with final heating being achieved just before extrusion through the die.

Similar relatively minor process modifications can be envisioned to fabricate the carbon foams of the present invention in injection molding, casting and other similar conventional material fabrication processes.

The following examples will serve to illustrate the practice of the invention

EXAMPLE

A layer about 2 inches deep of a mesophase carbon powder derived by the solvent extraction of petroleum pitch having a softening point of about 310° C. is deposited in mold equipped with a cover. The mold is lined with a ceramic glaze or spray applied ceramic lining. The cover includes a similar interior ceramic lining. The cover is optionally equipped with a sintered vent plug to permit purging of the interior of the mold with non-oxidizing gas. This configuration, incorporating also permits pressurization, if desired, to control expansion speed and/or pore size in the green foam as described hereinabove. Nitrogen gas is repeatedly introduced into the mold to assure that all oxygen is purged (generally 2–4 such purges have been found satisfactory) and to provide a one atmosphere pressure of nitrogen inside of the mold. The mold is then heated at a rate of from about 2 to about 10° C./min up to a temperature of about between about 450 and 600° C. and held at this temperature for a period sufficient to soften and then devolatalize and sinter the cellular product (generally less than about one hour and preferably between about 10 minutes and one hour). This treatment results in the production of an open celled green foam. The mold is then cooled to room temperature at a rate of less than about 10° C./min. to a temperature of 100° C.; any remaining pressure is then vented and the sample removed from the mold.

The green foam thus produced has a density of between about 0.4 and about 0.6 g/cm³ and demonstrates a compressive strength on the order of between about 2000 and 6000 psi. Thermal conductivity as determined by the guarded heat flow method is below about 1.0 W/m/K.

As the invention has been described, it will be apparent to those skilled in the art that the same may be varied in many ways without departing from the spirit and scope of the invention. Any and all such modifications are intended to be included within the scope of the appended claims.

What is claimed is:

1. A porous pitch-based foam produced from a mesophase carbon derived from at least one of a petroleum pitch and a coal tar pitch exhibiting a softening point above about 300° C., and having a density ranging from about 0.1 to about 0.8 g/cm³.

2. The porous pitch-based foam of claim 1 wherein said coal tar or petroleum pitch exhibits a softening point ranging from about 300° C. to about 400° C.

3. The porous pitch-based foam of claim 1 having a compressive strength below about 6000 psi.

4. The porous pitch-based foam of claim 1 that has been further carbonized.

5. The porous pitch-based foam of claim 1 that has been further graphitized.

6. A method for producing a carbon foam from a mesophase carbon particulate derived from a petroleum or coal tar pitch exhibiting a softening point above about 300° C., comprising:

placing mesophase carbon particulate in a mold;

heating said mesophase carbon particulate in said mold under a non-oxidizing atmosphere to a temperature ranging from about 300° C. to about 700° C. and soaking at this temperature for a period of from about 10 minutes to about 1 hour to form a green foam; and controllably cooling said green foam.

7. The method of claim 6, wherein said coal tar or petroleum pitch exhibits a softening point ranging from about 300° C. to about 400° C.

8. The method of claim 6, wherein said non-oxidizing atmosphere is applied at a pressure of from about 50 psi to about 500 psi.

9. The method of claim 6, wherein said temperature is achieved using a heat-up rate ranging from about 2° C. to about 10° C. per minute.

10. The method of claim 6, wherein said controlled cooling is accomplished at a rate of less than about 10° C./min to a temperature of about 100° C.

11. The method of claim 6, wherein said mesophase carbon particulate derived from a petroleum or coal tar pitch exhibiting a softening point above about 300° C. is produced by thermal treatment or solvent extraction of said petroleum or coal tar pitch.

12. A porous pitch-based foam produced from a mesophase carbon derived from a petroleum or coal tar pitch exhibiting a softening point above about 300° C., and having a density of ranging from about 0.1 to about 0.8 g/cm³ produced by a method comprising:

placing mesophase carbon particulate in a mold;

heating said mesophase carbon particulate in said mold under a non-oxidizing atmosphere to a temperature of ranging from about 300° C. to about 700° C. to form a foam.

13. The porous pitch-based foam of claim 12, wherein said coal tar or petroleum pitch exhibits a softening point ranging from about 300° C. to about 400° C.

14. The porous pitch-based foam of claim 12, wherein said non-oxidizing atmosphere is applied at a pressure ranging from about 50 psi to about 500 psi.

15. The porous pitch-based foam of claim 12, wherein said temperature is achieved using a heat-up rate ranging from about 2° C. to about 10° C. per minute.

16. The porous pitch-based foam of claim 12, further comprising the step of controllably cooling the foam at a rate of less than about 10° C./min to a temperature of about 100° C.

17. The porous pitch-based foam of claim 12, wherein said mesophase carbon particulate derived from a petroleum or coal tar pitch exhibiting a softening point above about 300° C. is produced by thermal treatment or solvent extraction of said petroleum or coal tar pitch.

* * * * *

(12) INTER PARTES REEXAMINATION CERTIFICATE (0038th)
United States Patent
Rogers

(10) Number: US 6,833,012 C1
(45) Certificate Issued: Nov. 11, 2008

(54) PETROLEUM PITCH-BASED CARBON FOAM

(75) Inventor: Darren Kenneth Rogers, Wheeling, WV (US)

(73) Assignee: Touchstone Research Laboratory, Ltd., Triadelphia, WV (US)

Reexamination Request:
No. 95/000,110, Sep. 8, 2005

Reexamination Certificate for:
Patent No.: 6,833,012
Issued: Dec. 21, 2004
Appl. No.: 09/976,175
Filed: Oct. 12, 2001

(51) Int. Cl.
*C04B 38/00* (2006.01)

(52) U.S. Cl. .................. 44/607; 264/29.6; 264/29.7; 423/445 R; 423/448; 423/460; 56/78

(58) Field of Classification Search .................. None
See application file for complete search history.

(56) References Cited

U.S. PATENT DOCUMENTS

| | | | |
|---|---|---|---|
| 4,005,183 A | | 1/1977 | Singer |
| 4,208,267 A | | 6/1980 | Diefendorf |
| 4,891,203 A | | 1/1990 | Singer |
| 5,259,947 A | * | 11/1993 | Kalback et al. ............. 208/44 |
| 5,437,780 A | * | 8/1995 | Southard et al. ............ 208/45 |
| 5,489,374 A | * | 2/1996 | Romine et al. .............. 208/45 |
| 5,631,086 A | * | 5/1997 | Singer et al. ............... 428/408 |
| 5,648,027 A | * | 7/1997 | Tajiri et al. ................... 264/43 |
| 6,315,974 B1 | | 11/2001 | Murdie |
| 2004/0177548 A1 | | 9/2004 | Rogers |

OTHER PUBLICATIONS

Material Safety Data Sheet dated Apr. 14, 1994 from Mitsubishi Corportion for Mitsubishi AR mesophase pitch.*

Klett, J. et al., High Thermal Conductivity Mesophase Pitch–Derived Carbon Foams: Effect of Precursor on Structure and Properties, Carbon 38(7):953:973 (2000).

Klett, J. et al., High Thermal Conductivity Mesophase Pitch–Derived Carbon Foams: Effect of Precursor on Structure and Properties, Carbon 99, Jul. 11–16, 1999.

Klett, J. et al., High Thermal Conductivity Mesophase Pitch–Derived Carbon Foams, 43rd Int'l SAMPE Symposium, May 31–Jun. 4, 1998.

* cited by examiner

*Primary Examiner*—Jerry D. Johnson

(57) ABSTRACT

Petroleum or coal tar pitch-based cellular or porous products having a density of preferably between about 0.1 g/cm³ and about 0.8 g/cm³ are produced by the controlled heating of mesophase carbon materials derived from coal tar or petroleum pitch having a softening point in excess of about 300° C. and preferably between about 300 and about 400° C. in a "mold" and under a non-oxidizing atmosphere. The porous product thereby produced, preferably as a net shape or near net shape, can be machined, adhered and otherwise fabricated to produce a wide variety of low cost, low density products.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1–17 are cancelled.

\* \* \* \* \*